3,205,908
FLUSH TANK VALVE
Oswald Sperlich, 203 Stonewall, San Antonio, Tex.
Filed June 25, 1963, Ser. No. 290,495
1 Claim. (Cl. 137—413)

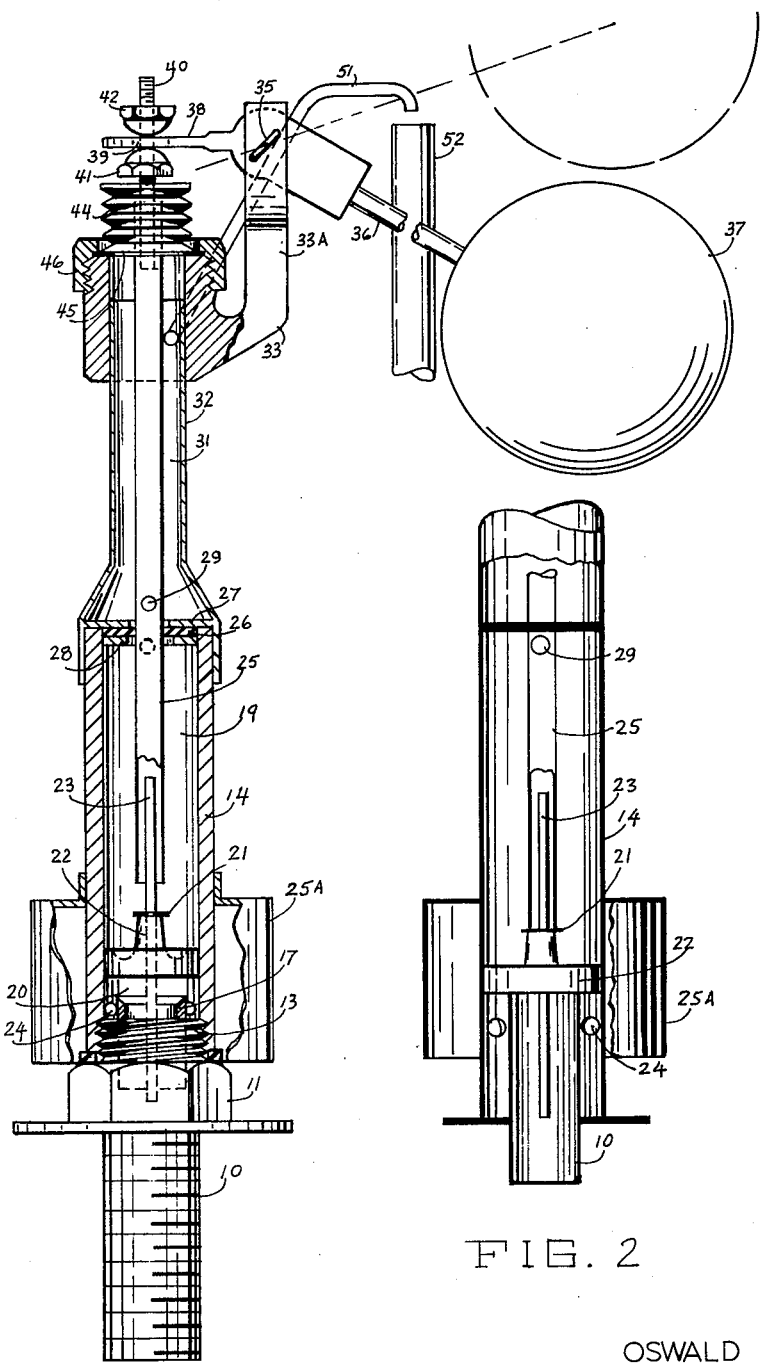

This application is a continuation-in-part application of Serial No. 243,150, filed December 7, 1962, entitled Flush Tank Valve, now abondoned.

The primary object of the invention is to provide a valve of the above mentioned character which is well adapted for use in connection with flush tanks, although it is not restricted to this use and may be used for other purposes.

A further object of the invention is to provide a valve of the above mentioned character having a piston-valve moved by unbalanced pressures upon its opposite ends, and which is reliable in operation, of highly simplified construction, produces the minimum noise in operation, and quickly discharges the water when the piston-valve is unseated.

A further object of the invention is to provide a by-pass arrangement which controls the pressure upon one side of the piston-valve which is in operating condition when the float is in a low position.

Other objects and advantages of the invention will be apparent during the course of the following description.

In the accompanying drawings, forming a part of this application, and in which like numerals are employed to designate like parts throughout the same, FIGURE 1 is a central vertical longitudinal section through the float controlled valve, FIGURE 2 is a schematic portrayal of the valve mechanism wherein the piston-valve is in a seated condition.

It will be appreciated that the instant invention makes a use of the combination of a hydraulic actuated shut off valve which is under positive control of the float mechanism while at the same time under the positive hydraulic pressure conditions of the main line. However, a feature of the present invention relates to means for maintaining the piston valve in a closed condition even though there is a drop in the main line pressure.

Referring to FIGURE 1, there is illustrated a standpipe 10 which is connected to a suitable source of water supply (not shown). Pipe 10 is secured to the bottom of a fllush tank of a water closet by a large nut 11. Threaded onto the top of pipe 10 is a valve body 14 as at male thread portion 13.

The pipe 10 terminates with an upwardly facing valve seat 17 which is securely sweated concentrically in pipe 10 and extends into a chamber 19 formed by valve body 14.

A piston-valve 22 is slidably positioned in valve body 14. The piston-valve 22 has a cup configuration upon which annular element 21 is positioned. Additionally, a centrally located tube 23 extends above and below piston-valve 22. It will be seen that by means of tube 23 communication is effected on both sides of the piston valve 22. When the piston valve 22 is in the position shown in FIGURE 1 it will be seen that water entering through standpipe 10 will be able to fill chamber 19 of the valve body 14. However, suitably positioned holes 24 permit the water to exit into the flush tank from lower chamber 20 of the valve body 14. In order to provide a more quiet operation a concentric annular shield 25A is positioned about the valve body 14 and encompasses the holes 24. Tube 23 extends upwardly to well within by-pass tube 25 which is of larger diameter and is concentric with tube 23 and valve body 14. By-pass tube 25 extends upwardly beyond valve body 14 and reciprocates with respect thereto along its longitudinal axis. In order to effect a water tight seal a gasket 26 is positioned between suitable bulkhead 27 at the upper part and a pressed-in annular ring 28 at the lower part. Further, it will be noted that by-pass tube 25 has a port 29 positioned radially therein. It will be seen that the upper portion of by-pass tube 25 extends into tubular housing 32 which forms chamber 31. A yoke carrying member 33 encompasses concentrically housing 32 and is affixed to the upper portion thereof. The yoke 33A extends upwardly and is displaced both horizontally and vertically from the housing 32.

The yoke 33A carries the pivot point 35 for the arm 36 carrying float 37. Arm 36 operates at pivot point 35 to move lever 38 upwardly or downwardly in a reciprocating fashion along a relative vertical line and along the axis of the flush tank valve of the present invention. Lever 38 has a slot therein 39 through which a rod 40 extends. The lower portion of rod 40 is sweated into by-pass 25 and seals it in a water tight manner. Rod 40 is suitably and adjustably threaded so that nuts 41 and 42 are threaded thereon and encompass lever 38 in a sandwich manner. The upper opening of housing 32 is closed by a bellows 44 which has a centrally located aperture at the upper portion through which rod 40 extends in a water tight manner. In other words, the bellows 44 moves with rod 40 inasmuch as it is affixed thereto. The lower portion of the bellows 44 is suitably connected to an annular member 45 which is affixed to the upper portion of yoke carrying member 33 by means of a locknut 46. Additionally, a tube 51 communicates with chamber 31 of housing 32 and the overfill tube 52 associated with flush tanks.

As was stated in the foregoing, the piston valve 22 is in a position in FIGURE 1 to permit the water to flow through apertures 24. At the same time, water is permitted to flow through tube 23 thereby filling chamber 19. Additionally, water is permitted to flow up by-pass tube 25 through aperture 29 into chamber 31 and exits through tube 51 to overfill tube 52. As float 37 is raised due to the influx of water in the tank as shown by dotted lines the lever 38 moves downwardly as arm 36 carrying the float 37 moves upwardly. The downward movement on the part of lever 38 impinges on nut 41 which is adjustably threaded onto rod 40. Rod 40 being secured to by-pass tube 25 moves by-pass tube 25 downwardly. In its downward movement the aperture 29 will move below gasket 26 and out of communication with chamber 31 but now making communication with chamber 19. The continuing flow of water through tube 23 then fills up chamber 19 to the point where hydraulic pressure is created on the upper surface of piston-valve 22 thereby moving it downwardly to seat on valve seat 17, thereby closing the pipe 10 and cutting off the supply of water through opening 24. In other words, at this point the hydraulic pressure on the upper side of valve 22 will exert pressure to maintain piston-valve 22 in a closed position. At the same time, the water level at its highest point in the flush tank will have been reached so that lever 38 will be exerting maximum pressure of a downward type moving valve 22 in ever tightening position as seen in FIGURE 2 where by-pass tube 25 is in abutment with annular element 21 and depresses it thereby having a further plus factor in seating piston valve 22; being the sum of the hydraulic pressure on the upper side and the pressure developed by the float and lever 38 on the annular element 21.

The advantage of the present invention is unique inasmuch as even when there is a decrease in the main line pressure of water, there is no release of the piston valve. The float through suitable linkage means exerts positive pressure on the upper surface of piston valve and shares in retaining the piston-valve in a closed position.

The materials used in the fabrication of the invention may vary from the conventional bronzes and brasses to plastics. The simplicity of the mechanism of the present invention compared to the conventional ball-cock valves makes it possible to use plastics almost entirely and to seal and cement together those elements which are now threaded together.

It will be apparent that many changes and modifications of the several features described herein may be made without departing from the spirit and scope of the invention. It is therefore apparent that the foregoing description is by way of illustration of the invention rather than limitation of the invention.

What is claimed is:

A valve comprising an elongated lower tubular housing, a concentrically positioned upwardly extending valve seat in the lower portion of said lower tubular housing, a piston valve positioned to seat on said valve seat, a centrally positioned conduit axially disposed in said piston valve to effect communication from one side to the other of said piston valve, an elongated vertically slidable by-pass conduit concentric with respect to said centrally positioned conduit and having a greater cross-sectional area, said by-pass conduit extending beyond said lower tubular housing into an upper housing, means to reciprocate said by-pass conduit, said by-pass having means to effect communication at a point intermediate its ends between the lower housing and the upper housing when said by-pass tube is substantially in its uppermost position, the upper portion of said piston having abutment means whereon the lower end of said slidable by-pass conduit abuts to drive said piston towards the valve seat.

References Cited by the Examiner

UNITED STATES PATENTS

| | | | |
|---|---|---|---|
| 506,145 | 10/93 | Young et al. | 251—43 |
| 2,228,552 | 1/41 | Arbogast | 137—414 |
| 2,588,242 | 3/52 | Hunter | 137—414 |
| 2,959,390 | 11/60 | Wyss | 251—43 |

ISADOR WEIL, *Primary Examiner.*
WILLIAM F. O'DEA, *Examiner.*